Patented Oct. 17, 1933

UNITED STATES PATENT OFFICE 1,930,885

PROCESS FOR THE TREATMENT OF HARD WATERS

Gustav Rittler, Stuttgart-Fellbach, Germany

No Drawing. Application February 23, 1933, Serial No. 658,253, and in Germany April 25, 1932

6 Claims. (Cl. 210—23)

As is known, water is generally prepared for use as boiler feed-water by treatment with lime/soda, soda, caustic soda, zeolites or phosphates. In these processes, however, due to the exchange of bases, the sodium of the softening agent always takes the place of the hardness constituent. There is consequently no actual purification since easily soluble salts such as soda, sodium bicarbonate, sodium sulphate or the like, are thereby introduced into the treated water and remain therein. The concentrations of these salts rapidly increase during the evaporating process in the boiler and give rise to a series of known disadvantages. The object of the present invention is to obviate this exchange of bases. This is attained by the use of phosphoric acid, either alone or together with barium compounds soluble in phosphoric acid, and the subsequent use of hydroxides of calcium, magnesium and ammonium in such manner that the hard water is first treated with phosphoric acid into which has been introduced a quantity of a soluble barium salt corresponding to the sulphate-content of the hard water, ammonium hydroxide being thereupon employed to promote the reaction and calcium or magnesium hydroxide being employed to remove any excess of phosphoric acid which may then be present. The softening agent according to the present process, therefore, is combined with the hardness constituents and is deposited together with these.

The following fact is the reason of the precipitation of the hardness constituents: Phosphoric acid is a tribasic acid, the hydrogen atoms of which may be split off in stages. The hydrogen atoms split off are replaced by the ions of the hardness constituents, so that tertiary phosphates are produced. This reaction, however, owing to the law of mass action, only takes place when there is present a sufficient excess of hydroxyl ions, which is attained by the addition of ammonia until a definite alkaline reaction is shown.

The reactions which take place can be formulated as follows:

(1) $3\,Ca^{++} \ldots + 2 \ldots PO_4^{---} = Ca_3(PO_4)_2 +\ldots\ldots$ (2) $Mg^{++} + NH^+ + \ldots PO_4^{---} = MgNH_4PO_4 + \ldots\ldots$ (3) $Ba^{++} + \ldots SO_4^{--} = BaSO_4 + \ldots\ldots$ The process will be further explained with the aid of examples:

1. In the case of water containing only carbonate:

The total quantity of the hardness constituents (lime, magnesia, iron, and manganese), expressed as calcium oxide, is found by analysis and the equivalent quantity of phosphoric acid is added to the water, whereupon ammonia is added until there is a clear alkaline reaction. The hardness constituents (lime, magnesia) are then precipitated quantitatively as tertiary calcium phosphate or ammonium-magnesium phosphates.

2. The water also contains sulphates:

Based on the sulphate-content obtained by analysis, an equivalent quantity of a barium salt is added to phosphoric acid and the phosphoric acid is introduced into the hard water, whereupon the sulphate is precipitated as barium sulphate. If the sulphate content is not too high, the further treatment can be as mentioned under 1. With hard waters having a high sulphate-content, there is present, on account of the solubility ratio of the barium salt in phosphoric acid, a more or less large excess of phosphoric acid which must be removed by means of limewater or magnesium hydroxide. To convert the soluble phosphates formed by the phosphoric acid into insoluble tertiary phosphates, ammonium hydroxide is then used as in Example 1.

In the above manner, therefore, it is possible, contrary to all previous processes, to obtain by chemical means a purified water free from easily soluble compounds. A preliminary removal of the iron or manganese is no longer necessary as these substances are simultaneously precipitated. From the economic standpoint, this process presents particular advantages that the sludge deposited in the softening of the water can be again used for the recovery of the phosphoric acid or as a fertilizer.

I claim:

1. A process for the treatment of hard water to purify and free it from easily soluble compounds comprising treating the hard water with phosphoric acid, subsequently adding ammonium hydroxide to facilitate the reaction and employing an alkaline earth hydroxide to remove any excess of phosphoric acid which may then be present.

2. A process of the character described comprising treating the hard water with phosphoric acid containing an amount of a soluble barium salt corresponding to the sulphate-content of the hard water, subsequently adding ammonium hydroxide to facilitate the reaction and employing an alkaline earth hydroxide to remove any excess of phosphoric acid which may then be present.

3. A process according to claim 1, wherein the alkaline earth hydroxide employed is calcium hydroxide.

4. A process according to claim 1, wherein the alkaline earth hydroxide employed is magnesium hydroxide.

5. A process according to claim 2, wherein the alkaline earth hydroxide employed is calcium hydroxide.

6. A process according to claim 2, wherein the alkaline earth hydroxide employed is magnesium hydroxide.

GÜSTAV RITTLER.